United States Patent [19]

Schmalenbach et al.

[11] Patent Number: 4,924,911
[45] Date of Patent: May 15, 1990

[54] THREE-WAY VALVE

[75] Inventors: Dietrich Schmalenbach, Baltmannsweiler; Bernhard Henke, Brilon, both of Fed. Rep. of Germany

[73] Assignee: F. W. Oventrop, KG., Olsberg, Fed. Rep. of Germany

[21] Appl. No.: 391,189

[22] Filed: Aug. 8, 1989

[30] Foreign Application Priority Data

Aug. 12, 1988 [DE] Fed. Rep. of Germany ... 8810233[U]

[51] Int. Cl.⁵ ............................................ F16K 11/048
[52] U.S. Cl. .................................. 137/625.5; 137/270
[58] Field of Search ................ 137/625.5, 270, 625.49, 137/625.27

[56] References Cited

U.S. PATENT DOCUMENTS

| | | | |
|---|---|---|---|
| 3,202,170 | 8/1965 | Holbrook | 137/625.5 X |
| 3,779,280 | 12/1973 | Evans et al. | 137/625.5 |
| 3,858,607 | 1/1975 | Baker | 137/625.5 |
| 3,926,218 | 12/1975 | Weller | 137/625.27 |

*Primary Examiner*—Arnold Rosenthal
*Attorney, Agent, or Firm*—Herbert Dubno; Ronald Lianides

[57] ABSTRACT

A three-way valve has its inlet fitting fixed to a housing and a pair of outlet fittings on opposite sides of the inlet fitting are formed on annular compartments which are rotatable on the housing to simplify orientation of the fittings for installation in pipe networks and the like.

10 Claims, 2 Drawing Sheets

THREE-WAY VALVE

FIELD OF THE INVENTION

Our present invention relates to a three-way valve and, more particularly, to a valve having a single inlet and two outlets and suitable for use in distribution of and flow of a fluid, usually a liquid, switchover of flow and like fluid mechanical operations for bivalent or two-condition heating plants or heat storage units.

BACKGROUND OF THE INVENTION

In heating plants and in connection with heat storage units, it is a common practice to provide a three-way valve which can switch over flow from a source to either of two outlet paths. For that purpose, the valve may comprise a valve housing having a single inlet and two outlets, and a double valve assembly within the valve housing for alternatively connecting each of the two outlets with the inlet. The two valve bodies of this assembly can be held together by a common valve spindle which can be axially displaced by a control element.

In earlier three-way valve systems of this type, the inlet is rigidly fixed on the housing, a first outlet is disposed coaxial thereto and is usually also rigidly fixed with respect to the housing, while a second outlet is oriented at a right angle to the coaxial inlet and outlet. The flowing medium is thus deflected through a right angle upon switchover from the one outlet to the other outlet.

The controlled element may be an electric thermal valve actuator operating, for example, in response to a two-point controller.

The straight path through the valve housing can be blocked when the right angle path is fully opened and vice versa. Continuously operating controllers for actuating the valve spindle can also be used. In general, such continuous controllers can be proportional controllers operating without auxiliary energy forces and permitting intermediate positions of the valve to be obtained. With increasing temperature at a sensor, the straight passage is progressively closed and the angled passage progressively opened.

It has been found to be a disadvantage of these earlier valves that the orientation of the outlets does not always allow an installer to conveniently install the valve. The valve frequently must be installed with inconvenient piping runs to accommodate the piping system to the valve structure.

Alternatively, the installation must have available a stock of valves with outlets at different orientations. Both of these situations are inconvenient and costly.

OBJECTS OF THE INVENTION

It is, therefore, the principal object of the present invention to provide an improved three-way valve whereby these drawbacks are avoided.

Another object of our invention is to provide an improved three-way valve which is far more versatile with respect to installation capabilities than earlier valves for similar purposes.

Yet another object of the invention is to provide a valve for a simple and relatively inexpensive construction which can be readily integrated into piping networks in a simple and convenient manner.

SUMMARY OF THE INVENTION

These objects and others which will become apparent hereinafter are attained in accordance with the invention in a three-way valve in which the inlet and outlet fittings all extend perpendicular to the valve spindle and the displacement axis of the valve members, wherein, further, the inlet fitting is a tubular fitting rigid with the valve housing, and the outlet fittings are rotatable or angularly displaceable relative to one another and to the housing about this axis.

With this arrangement, it is possible to connect the valve in a network with greater versatility because the outlet fittings can be disposed at any angle relative to one another and to the axis of the inlet fitting, about the actuating axis of the valve members. The inlet fitting rigidly fixed to the housing can thus be connected to the corresponding pipe and the outlet fittings then rotated on the housing body into such directions as will enable them to be connected to further pipes with a minimum of effort and piping.

Preferably, the outlet fittings are provided on annular compartments which communicate through the housing or valve body wall via radial openings in the housing wall. The outlet fittings project radially from the respective annular compartments. It has been found to be advantageous, moreover, to retain the annular compartments on the housing with spring rings immobilizing the compartments in the axial sense but allowing annular displacement of the compartment on the housing.

It has been found to be especially desirable to provide the housing substantially midway between the outlet fittings with a chamber traversed by the valve spindle and into which the fixed inlet fitting opens.

The housing has a pair of openings which are axially spaced apart and can be selectively blocked by the two valve members of the valve assembly and which communicate with a pair of further chambers which can be disposed above and below the centrally disposed chamber. These further chambers are surrounded by the respective compartments and open into them via the radial openings previously described.

The three-way valve of the invention can therefore comprise:

a valve body surrounding an axis of the valve body and formed with an inlet at a fixed location on the housing extending transversely to the axis and opening into a valve chamber formed in the housing;

a pair outlet fittings extending transversely to the axis and communicating with the chamber on opposite axial sides thereof, each of the outlet fittings being rotatable about the axis for establishing various relative angular positions of the fittings relative to one another and to the inlet about the axis;

respective axially displaceable valve members spaced apart along the axis and respectively positioned to alternately block communication between the inlet and one of the outlet fittings while communicating between the other outlet fitting and the inlet, and a stem extending along the axis and connecting the valve members for joint axial displacement into a double-valve assembly; and means for axially shifting the assembly relative to the body.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
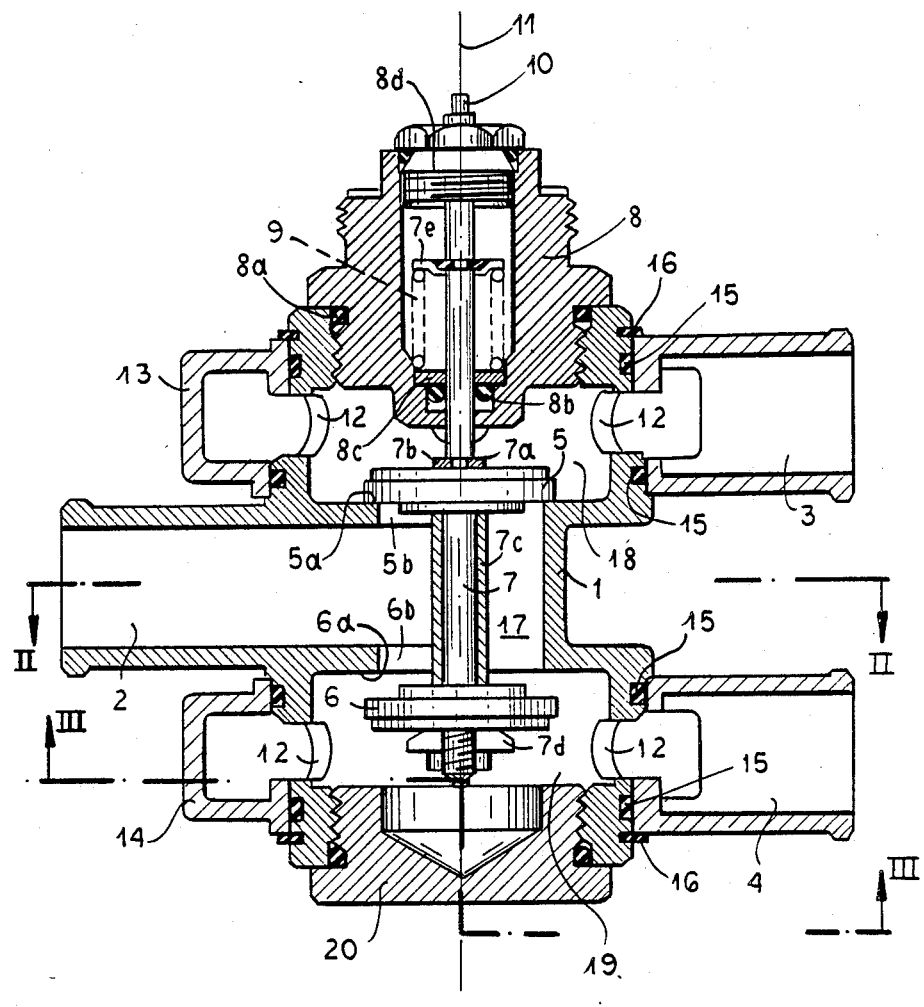
FIG. 1 is an axial cross sectional view through a three-way valve according to the invention.

The three-way valve of the invention comprises a valve housing having an inlet fitting 2 formed rigid with the housing and, indeed, unitarily therewith.

The inlet fitting has its axis at a right angle to the actuating axis 11 of the valve. The valve also has two outlet fittings 3 and 4.

Within the valve housing, a double valve assembly is provided with valve members 5 and 6 in the form of disks secured to a common valve spindle 7. The disk 5 may be held against a spring ring 7a lodged in a groove 7b of the valve stem and is separated by a spacer 7c from the valve disk 6 which is affixed on the threaded end of the stem 7 by a nut 7d.

The valve members 5 and 6 cooperate with the valve seats 5a and 6a, respectively, surrounding openings 5b and 6b communicating between a central chamber 17 and upper and lower chambers 18 and 19 respectively which will be described in greater detail. With the valve in the position shown, communication is effected between the inlet 2 and the outlet 4. When the valve is shifted to its upper position so that member 6 blocks the opening 6b, communication is established from the inlet 2 to the outlet 3.

The valve spindle 7 passes through a closure member or plug 8 which is threaded into the housing 1 with interposition of an O-ring 8a for sealing effect.

Within the plug 8, a seal 8b is provided to seal around the stem 7. The compression spring 9 is seated against a washer 8c in the plug 8 and against a plate 7e on the valve stem and biasing the valve stem upwardly, the valve stem also passing through a closure plug 8d so that an extremity 10 projecting therefrom can be engaged by a valve actuator of any conventional design It will be apparent that, in the configuration shown, the spring 9 normally holds the valve in a position such that inlet 2 can communicate with outlet 3. Upon depression of the actuating end 10, flow is switched over.

According to the invention, the inlet 2 and the outlet fittings 3 and 4 extend transversely to the valve spindle and its axis 11 and preferably lie at right angles thereto.

Figure 2:
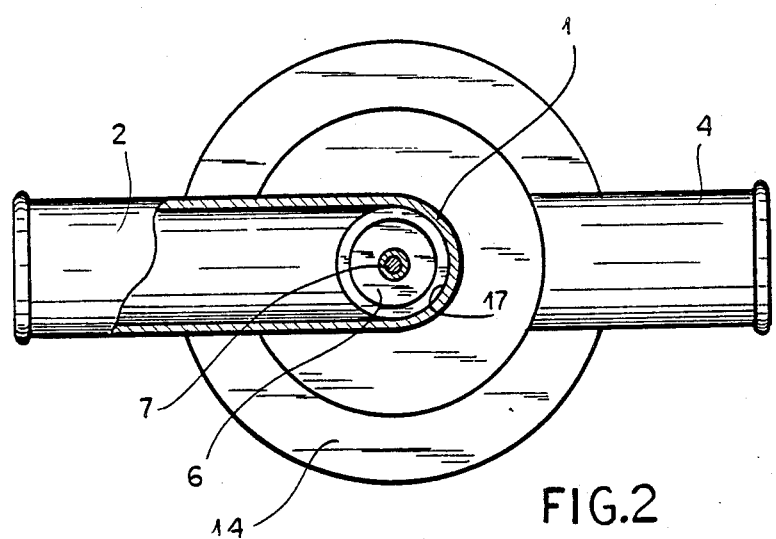
FIG. 2 is a cross sectional view taken along the line II—II of FIG. 1.
Figure 3:
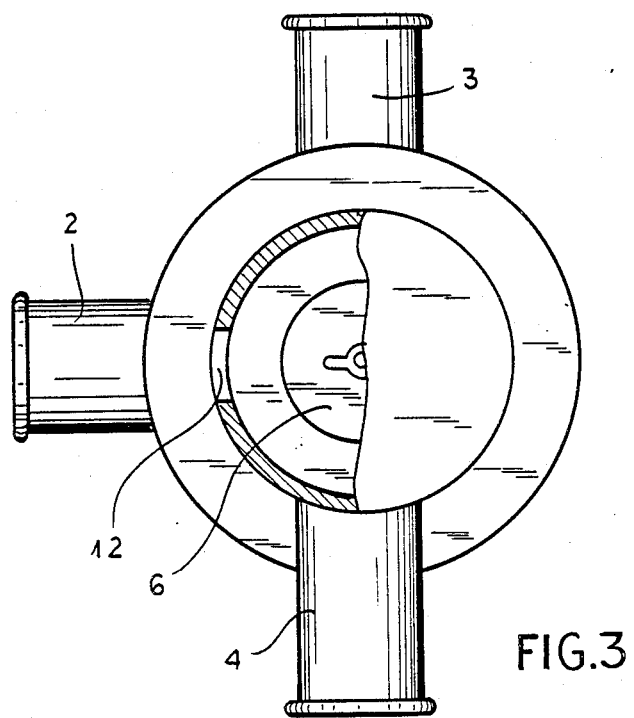
FIG. 3 is a cross sectional view taken along the line III—III of the valve of FIG. 1 but showing the two outlet fittings thereof rotated to lie at right angles to the inlet fitting but at 180° to one another, thereby demonstrating the versatility of the valve of the invention.

The inlet fitting 2 is rigid with the housing 1 while the outlet fittings 3 and 4 are respectively switchable about the axis 11. For example, in FIGS. 1 and 2, the fittings 3 and 4 lie in the same axial plane as the inlet fittings 2. However, in FIG. 3, the outlet fitting 3 has been shown to have been swung through 90° in the counterclockwise sense while the outlet fitting 4 has been swung through 90° in the clockwise sense so that both outlet fittings form an angle of 180° with one another but lie at 90° to the inlet fitting 2.

For this purpose, the outlet fittings 3 and 4 are respectively formed on annular compartments 13 and 14 which communicate with the aforementioned chambers 18 and 19 through radial ports 12 in the wall of the housing 1.

The annular compartments 13 and 14 are sealed by O-ring-type or other annular seals 15 with respect to the housing 1 and are held in place against axial movement by spring rings 16 lodged in respective grooves of the housing 1. While the spring rings hold the chambers against axial movement, they permit rotation of the compartments and the outlet fittings.

The housing 1 is formed with the chamber 17 around the stem 7 substantially midway between the outlet fittings 3 and 4 and this chamber or passage 17, which communicates with the inlet 2, opens into the chambers 18 and 19.

Assembly of the valve is facilitated in that the compartments 13 and 14 can be simply slipped over the housing 1 and secured in place by the spring rings 16. The plug 8 can then be screwed into the upper part of the housing. A plug 20 can be screwed into the lower part of the housing 1 and, upon removal, affords access to the valve body 6 and allows draining and cleaning of the valve. The mobility of the outlet fittings 3 and 4 is not hindered by the inlet fitting 2 since the rotation planes of the outlet fittings 3 and 4 lie externally of the surfaces of the inlet fitting 2.

We claim:

1. A three-way valve, especially for a bivalent heating plant or heat storage, comprising:

a valve housing surrounding an axis of the valve housing and formed with an inlet at a fixed location on said housing extending transversely to said axis and opening into a valve chamber formed in said housing;

a pair of outlet fittings extending transversely to said axis and communicating with said chamber on opposite axial sides thereof, each of said outlet fittings being rotatable about said axis for establishing various relative angular positions of said fittings relative to one another and to said inlet about said axis, each of said outlet fittings being formed on an annular compartment surrounding said housing and communicating with said chamber through a plurality of radial openings formed in said housing;

respective axially displaceable valve members spaced apart along said axis and respectively positioned to alternately block communication between said inlet and one of said outlet fittings while communicating between the other outlet fitting and said inlet, and a stem extending along said axis and connecting said valve members for joint axial displacement into a double-valve assembly; and means for axially shifting said assembly relative to said housing.

2. The three-way valve defined in claim 1, further comprising respective annular seals flanking the openings communicating with each of said annular compartments and sealingly interposed between the respective compartment and said body.

3. The three-way valve defined in claim 1 wherein said outlet fittings extend radially from the respective compartments.

4. The three-way valve defined in claim 3 wherein each of said compartments is held axially against an annular shoulder of said housing by a spring ring seated in said housing and permitting rotation of the respective compartment relative thereto.

5. The three-way valve defined in claim 4 wherein said housing is formed with said chamber surrounding said stem and generally centrally between said compartments, and a pair of further chambers axially flanking the first-mentioned chamber and communicating therewith, each of said further chambers being surrounded by a respective one of said compartments and communicating therewith through a respective plurality of said openings.

6. The three-way valve defined in claim 5 wherein between each of said further chambers and the first chamber, a respective seat engageable by a respective valve member is formed.

7. The three-way valve defined in claim 6 wherein said valve members are respective disks.

8. The three-way valve defined in claim 1 wherein said housing is formed with said chamber surrounding said stem and generally centrally between said compartments, and a pair of further chambers axially flanking the first-mentioned chamber and communicating therewith, each of said further chambers being surrounded by a respective one of said compartments and communicating therewith through a respective plurality of said openings.

9. The three-way valve defined in claim 8 wherein between each of said further chambers and the first chamber, a respective seat engageable by a respective valve member is formed.

10. The three-way valve defined in claim 9 wherein said valve members are respective disks.

* * * * *